US 6,697,473 B2

(12) United States Patent
Batten

(10) Patent No.: US 6,697,473 B2
(45) Date of Patent: Feb. 24, 2004

(54) AUTOMATED PERSONALIZED TELEPHONE MANAGEMENT SYSTEM

(76) Inventor: Bobby G. Batten, 255 Archers Mead, Williamsburg, VA (US) 23185

(*) Notice: Subject to any disclaimer, the term of this patent is extended or adjusted under 35 U.S.C. 154(b) by 266 days.

(21) Appl. No.: 09/986,955

(22) Filed: Nov. 13, 2001

(65) Prior Publication Data

US 2002/0076026 A1 Jun. 20, 2002

Related U.S. Application Data

(60) Provisional application No. 60/250,517, filed on Dec. 4, 2000.

(51) Int. Cl.[7] .................. H04M 1/665; H04M 1/57; H04M 1/64; H04M 3/42
(52) U.S. Cl. ............... 379/199; 379/88.18; 379/88.26; 379/142.06; 379/142.08; 379/142.09; 379/210.02; 379/215.01
(58) Field of Search ................ 379/33, 88.16, 379/88.18, 88.22, 88.26, 142.01, 142.06, 142.08, 142.09, 142.17, 188, 196, 197, 198, 199, 200, 201.01, 207.15, 210.02, 215.01

(56) References Cited

U.S. PATENT DOCUMENTS

| 3,482,057 A | | 12/1969 | Abbott ................ 379/67.1 |
|---|---|---|---|
| 3,784,721 A | * | 1/1974 | Kilby .................... 379/74 |
| 3,793,487 A | * | 2/1974 | Kilby .................... 379/74 |
| 4,277,649 A | * | 7/1981 | Sheinbein ............ 379/211.02 |
| 4,451,704 A | | 5/1984 | Winkelman ............ 379/67.1 |
| 4,802,202 A | | 1/1989 | Takahashi ............ 379/88.19 |
| RE34,536 E | | 2/1994 | Frimmel ............... 379/67.1 |
| 5,388,150 A | | 2/1995 | Schneyer ............. 379/88.19 |
| 5,434,906 A | | 7/1995 | Robinson ............. 379/88.23 |
| 5,636,269 A | | 6/1997 | Eisdorfer ............ 379/215.01 |
| 5,668,862 A | | 9/1997 | Bannister ........... 379/207.14 |
| 5,727,045 A | | 3/1998 | Kim .................... 379/88.18 |
| 5,757,899 A | * | 5/1998 | Boulware et al. ........ 379/196 |
| 5,812,640 A | | 9/1998 | Chawla ............... 379/88.19 |
| 5,815,551 A | | 9/1998 | Katz ................... 379/88.19 |
| 5,825,867 A | | 10/1998 | Epler ................. 379/215.01 |
| 5,872,840 A | * | 2/1999 | Wu ....................... 379/197 |
| 6,061,450 A | | 5/2000 | Bauer ................. 380/59 X |
| RE37,073 E | | 2/2001 | Hammond ............ 379/67.1 |
| 6,418,211 B1 | * | 7/2002 | Irvin .................. 379/188 |

* cited by examiner

*Primary Examiner*—Harry S. Hong
(74) *Attorney, Agent, or Firm*—George F. Helfrich

(57) ABSTRACT

A holistic, automated, personalized telephone call management system is capable of responding to all incoming calls. The system employs customized software, computer chips, printed circuit board, ANI, where available, and a data input/output module, which are applied in an integrated manner to accomplish a broad array of functions important to modem household communication needs. System accepts operational time factors and telephone numbers as stored data to be matched automatically with the telephone numbers of incoming calls. The telephone rings under certain qualifying criteria, and an incoming call is passed in silent mode to a smart answering machine under other criteria. The smart answering machine is capable of handling emergency call situations, and the integration of call-waiting options. System also has a smart software function to deal with a state of delinquency on any lease/rent contract for the system.

11 Claims, 6 Drawing Sheets

AUTOMATED PERSONALIZED TELEPHONE MANAGEMENT SYSTEM

This application claims the benefit of U.S. Provisional Application No. 60/250,517, filed Dec. 4, 2000, and entitled "Telecommunications Privacy Control Module."

BACKGROUND OF THE INVENTION

1. Field of the Invention

This invention relates generally to telephonic communications. It relates particularly to a holistic personalized telephone call management system for effectively dealing with a wide array of consumer concerns with today's telephonic communications systems and services.

2. Description of the Related Art

U.S. Pat. No. 4,802,202, dated Jan. 31, 1989, discloses an invention that is directed to call blocking of all calls other than incoming calls, whereby the caller keys in a telephone number that matches one of the phone numbers stored in the system. This system is designed to protect the owner against prank calls and wrong numbers. Thus, it performs a narrow service rather than providing an overall personalized call management system, i.e. a call management system that accepts all calls and still provides privacy from all types of unwanted call interruptions (e.g. marketing calls, solicitation calls, political survey calls, wrong numbers, and prank calls). This patent does not:

1) Provide for incoming emergency call situations.
2) Provide for other important call situations that are outside the parameters of the pre-coded call acceptance system.
3) Provide a hands-free automatic operating system, but rather requires the caller to input his telephone number under all conditions.
4) Provide for an automated interaction with Internet operations and incoming telephone calls.
5) Provide for a means to effectively handle any callers that may inappropriately utilize emergency functions of a given system, although emergency functions were not provided for in this patent.
6) Provide for answer machine interfaces that would allow the system to act as a "smart system."
7) Provide for breaking stored codes into priority groups and assigning different time periods for incoming call acceptance.
8) Provide for automatically changing call acceptance time periods for weekends vs. weekdays.

U.S. Pat. No. 5,388,150, dated Feb. 7, 1995, discloses an invention to provide automatic incoming telephone call identification and disposition. Call dispositions of the system include: telephone ring, ring suppress, and connection to answering machine or fax. The system database directory includes telephone numbers for calling out and telephone codes and disposition calendars for processing several caller response options. The options for callers are controlled by a clock and calendar according to pre-selected disposition calendar information. This system begins with two sources of identification input to drive the system intelligence, that being ANI service to passively identify the caller when the caller is using a telephone within a specified ANI calling region, and is not blocking ANI performance, and secondly, requesting the caller to input identification data in other cases. These methods of collecting identification data on the caller were also identified by the inventors as being in the prior art systems, and the implication is that this patent is novel in its functionality included in the system's capability to accommodate both home needs and home office needs. This system requires broad data input, rather than being a simple to operate, personalized home system. It also does not address in its novel applications a simple hands-off rationale to effectively address incoming calls from persons contained in the system database, but who are calling from telephones that are outside the database, for example, from telephone booths. More importantly, the system described in this patent does not disclose a means to break into the system methodology in emergency situations (e.g. hospital emergency) and command attention from the called party in real time. Additionally, this system does not provide a means to isolate a given telephone number, utilized by a calling party who has inappropriately broken into the call acceptance rationale, and have the system block completely any future call emanating from the isolated number. Also, this patent does not address the important potential interplay with users of the Internet, nor does it integrate unique interaction with call-waiting situations.

In summary, the system disclosed in U.S. Pat. No. 5,388,150 is found wanting, in that it:

1) Does not provide for hands-free system methodology to allow an emergency caller to break into system call acceptance rationale and command attention from the called party in real time.
2) Does not provide for recording the number such an emergency call originated from.
3) Does not provide for isolating telephone numbers of callers that have inappropriately utilized the emergency call methodology, to be viewed by the system as non-acceptable future callers.
4) Does not provide for a customized, personalized call management interface with Internet usage.
5) Does not provide for the integration of call waiting with personalized system management functions.
6) Does not provide for an elegant system, whereby no participation is required of the called party other than to answer the phone when it rings, including emergency cases.
7) Does not provide for automatic tracking of the days of the week vs. the weekend days, with automatic changes in answer scheduling.

U.S. Pat. No. 5,636,269, dated Jun. 3, 1997, discloses an invention that primarily addresses prioritizing call waiting. Information about the identity of the calling party is obtained from the calling station. This information is processed to determine call routing treatment that allows the called party to determine whether to interrupt a call in progress to respond to the call-waiting signal. Clearly, the system does not provide a personalized telephone management system that is hands off for the user.

U.S. Pat. No. 5,825,867, dated Oct. 20, 1998, discloses an invention that utilizes interaction of the caller to determine whether to interrupt the called party who is already engaged in a telephone conversation. This system is designed to provide enhanced call waiting for both the caller and called party, and clearly does not provide a personalized telephone management system.

U.S. Pat. No. 5,727,045, dated Mar. 10, 1998, discloses a method for avoiding undesired incoming calls, which requires the calling party to input an aural message indicating the telephone number of the calling party, followed by a predetermined key input. The called party's telephone may then ring if the input matches a selective calling mode. This system requires significant input from the caller, which may be offensive, and clearly is not a hands off system that is customized to address all personal communications issues for the call receiver, including those highlighted functions discussed in U.S. Pat. No. 4,802,202.

SUMMARY OF THE INVENTION

It is the primary object of the present invention to supply what is lacking in the related art by providing a holistic, automated, personalized telephone call management system.

The present invention eliminates the negative, annoying aspects of telecommunication entering an individual's private residence, while providing for all of the desired communication access and functions to support modem household activities. The system provides the means for the home owner/renter to automate and customize the receipt and management of incoming telephone service to a highly personalized methodology and performance. Indeed, the system affords a wide flexibility in automated management functions by providing the means for a person to elect to receive phone calls in a timely order of priority while maintaining a peace and quiet living environment in the home. The system was designed using a holistic approach to embrace different life styles and the need to accommodate varying communication environments and possible emergency developments/occurrences. Operational rationale and functions are as follows:

1) System provides a person with options to input telephone numbers by priority groups (e.g. family, friends, other). Priority lists of inputted telephone numbers are utilized in the system management process.

2) System provides a person with options, by priority group, to input time periods for telephone call acceptance.

3) System can automatically change time periods for call acceptance for weekdays vs. weekend days.

4) System will only ring the telephone for incoming calls emanating from numbers matching the preset priority group database and only when the time is within the preset time acceptance periods. All other incoming calls will be transferred to the smart answering message system, a recorded message response not audible to the person at home will be given, and the caller will then have to leave a message to communicate.

5) Emergency situations are provided for, whereby an incoming call needs to ring the home occupant's phone although the stored telephone data will not provide an acceptable match to activate a ring (e.g. child has car accident and hospital is calling). The system provides for such an emergency case by prompting the caller through the smart messaging system to allow the caller to press star, which opens the system to additional methodology to ring the phone.

6) If the system receives an emergency call, it records the caller's number, whether the call is answered or the person is not home and the call is not answered. A special indicator blinks if an emergency call has been received.

7) The system also provides for effectively dealing with any cases, whereby a caller inappropriately utilizes the star key to break into the system's emergency methodology. The home occupant simply transfers the caller's telephone number from the recorded emergency call data bank into a non-acceptable caller data bank, whereby any later call originating from this number will not activate the system in any manner.

8) A further important consideration is that the system allows a caller, whose personal telephone number is included in the data bank but who is calling from a phone number not included in the system's data bank, to be able to enter the system methodology for activating a ring via the press star emergency mode.

9) The system provides interacting methodology to manage a different priority call selection when a person is using the Internet on the same telephone line. A person may expect to be on the Internet for a short period, but actually remains on the Internet for an extended period. The system protects against missing an important call back by allowing the user to store selected telephone numbers in a special Internet operations grouping, or the emergency methodology can also be activated under these conditions.

10) For those users who also elect to have call-waiting, the call-waiting beep will only be activated when the incoming call number matches one of the priority settings, otherwise the call-waiting party will be connected to the smart answer machine. Additionally, the home occupant has the option to allow only one of the caller acceptance priority groupings to activate a call waiting interruption.

11) System provides a non-blinking red light to indicate recorded non-emergency messages.

12) System can be remotely interrogated for messages.

13) System is augmented with a battery to maintain current time and day input.

14) Examples of smart, hands-off answer system functions and interaction follow:

System beginning response to an incoming call:
Smart, hands-off answer system comes on and states "one moment, please" (message #1) to the caller to prevent caller from questioning any minor time delay while the system processes the incoming call, and then system checks first to see if call is coming from a number contained in the stored data box relating to non-acceptable callers. If match with this box occurs, system states "we do not accept calls from you" and shuts down. If no match with this data decision box, system then processes incoming call through the following possible cases:

Case I:
Incoming calls with ANI service that do not block their identifying number and originate from phone numbers not included in the system's stored data:
System states, "you have reached the xxxxx residence. Please leave a message with your name and phone number; however, solicitation and marketing calls will not be returned unless responding to our invitation. If this is an emergency, please press star on your phone now (message #2)."

Case II:
Emergency option is activated and 4 rings have occurred
System states, "your emergency call will be returned ASAP—the xxxxx's are not home at this time" (message #3).

Case III:
Incoming calls that block their identifying number (or originate from areas where the telephone service provider does not provide outgoing call identification)
System states, "you have reached the xxxxx residence. Please leave a message with your name and telephone number; however, solicitation and marketing calls will not be returned unless responding to our invitation. If this is an emergency, please key in your personal area code and telephone number or the number you are calling from, and then press star on your phone" (message #4). If emergency option is activated, system first checks inputted caller ID number against the data stored in box relating to acceptable caller telephone numbers. The system rings the telephone if there is a match, if no match exists, the system checks against non-acceptable caller box. If match occurs with data stored in this box, system states "we do not accept calls from you" and shuts down. If no match with the non-acceptable caller decision box, system records caller's inputted telephone number in the emergency call received box and activates ringing of the residence phone.

NOTE: System has option key to disable the emergency access procedure for Case III callers, for any selected period, should the home occupant be confronted with a situation where a caller has become a harasser. A harasser is classified as someone who keys in erroneous phone numbers as being the caller's phone number. Should the emergency access procedure be disabled for Case III callers, the emergency access will continue to function for callers having their phone numbers stored in the acceptable caller data box. All other callers will receive a second message from the smart answer machine that states that caller must leave an emergency message for a return call ASAP.

Case IV:

Incoming calls from telephone numbers included in system data bank—but party is not answering, or the call is not in the time period for acceptance:

System states, "you have reached xxxxx; sorry we are unable to answer, please leave a message" (message #5).

Case V:

If the consumer for the present invention lives in an area where ANI is not available, the consumer may input telephone numbers for local hospitals/Police/Fire/etc., in the stored acceptable caller box, or allow the emergency system to be utilized. In such telephone service areas without ANI capability, friends and family must key in their telephone numbers when calling.

15) System can manage a one telephone number capability, whereby home phones and cellular phones are tied in together to the automated personalized telephone management system.

16) System can be implemented as a home consumer product or implemented as a value-added service by a telecommunications provider, utilizing a personalized service management module located in the infrastructure of the telecommunications provider.

17) System can use Internet capabilities to allow people with Internet services to program logic for personalized service management module maintained by telecommunications provider as a value-added service.

Highlighted Advantages of the Present Invention are as Follows:

1) All marketing calls must go through voice mail and do not cause the telephone to ring.

2) All miscellaneous inquiries, e.g. solicitation calls, must go through voice mail and do not cause the telephone to ring.

3) Late night wrong number call disturbances are eliminated.

4) Incoming calls can be prioritized for activating a ring, depending on the situation for a given day or night (e.g. family only)

5) An environment of privacy and convenience is maintained exceeding an unlisted telephone number/status (i.e. the homeowner/renter does not have to call and provide a private number to all parties who are thought of as priority callers. Also, friends or family who may have lost the privacy protected number can, under the present invention, look up the number in the telephone directory. Additionally, private telephone numbers are difficult to keep out of circulation for an extended period of time.).

6) A person at home may answer incoming calls at a number of telephone extensions, and know that a call is from a party that the person wishes to talk with at the time the call is being received.

7) The homeowner/renter/user may elect subsequently to have readouts on all telephones relative to those numbers that are prioritized to ring in.

8) The homeowner/renter/user does not have to be interrupted by a ringing telephone and the necessity of checking Caller ID to see if the telephone call should be answered.

9) The present invention helps toward efforts by the government to protect the privacy of persons in the home.

10) The present invention provides means for homeowner/renter to avoid spending any time on any obscene or harassing telephone calls.

11) The present invention provides simple procedure/methodology to create a telephone ring to capture real time attention of the called party to address emergency or other important calls that occur outside of the preset personalized call management system.

12) The present invention allows use of the internet on the same telephone line without having to worry about missing emergency calls or calls from certain preset telephone numbers programmed for interaction with called party's internet usage.

13) The present invention allows a call waiting function to be tied in with any incoming call pattern desired utilizing the call priority stored data.

14) The present invention allows the called party to transfer unwanted calling party numbers to an unacceptable caller data bank and processing routine.

15) The present invention will automatically track days of the week to match with phone ring acceptance planning.

16) For callers outside ANI service areas, callers have only to recall and key in their own phone numbers. No other code must be memorized and no other interaction is necessary.

17) The present invention helps to alleviate phone tag.

This combination of advantages is clearly unobtainable in any device or system of the known art.

BRIEF DESCRIPTION OF THE SEVERAL VIEWS OF THE DRAWINGS

For a more complete understanding of the present invention, including its primary object and attending benefits and advantages, reference should be made to the Detailed Description of the Invention, which is set forth below. This Detailed Description should be read together with the accompanying Drawings, wherein.

DETAILED DESCRIPTION OF THE INVENTION

Figure 1:
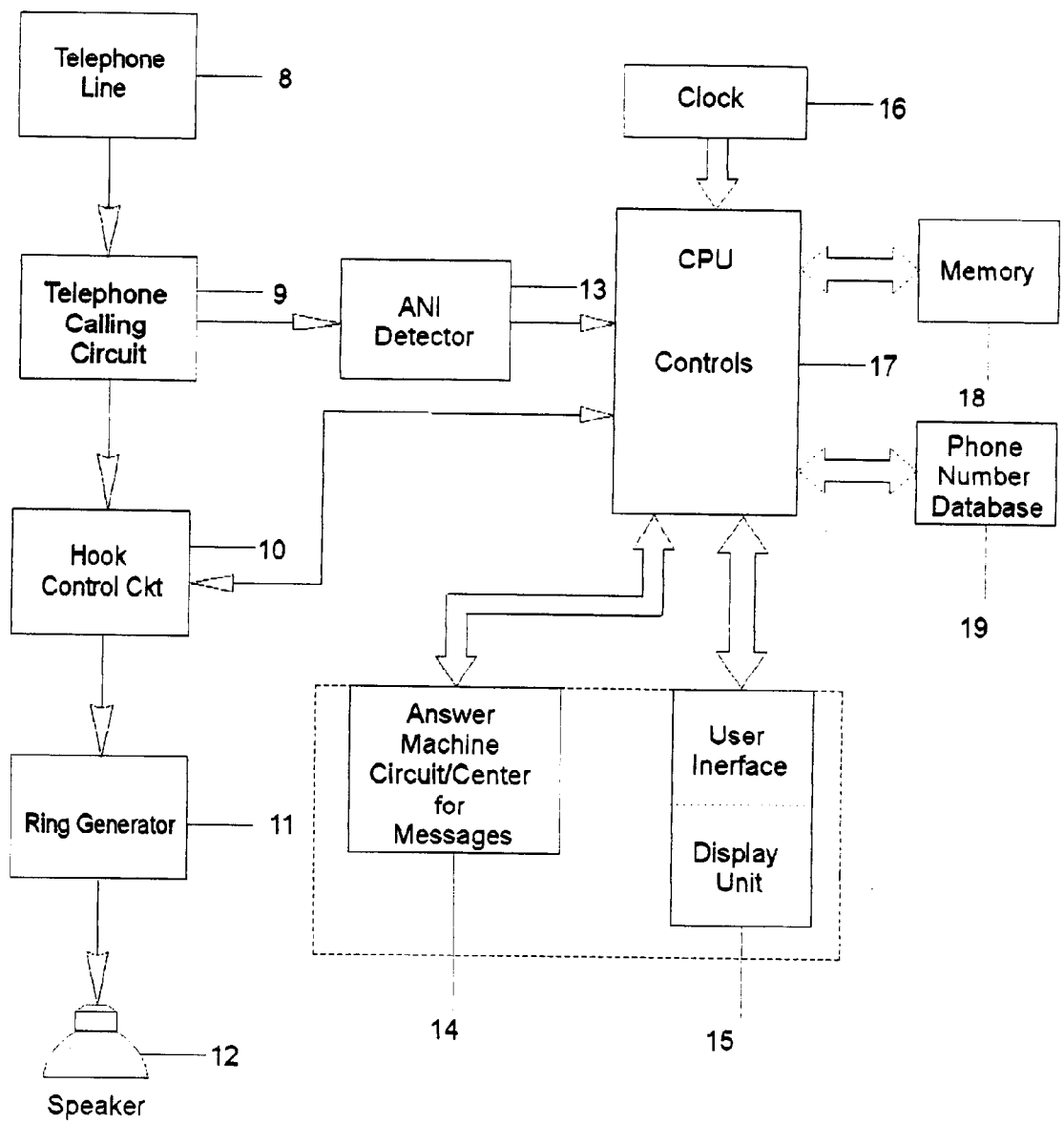
FIG. 1 is a functional block diagram of the automated personalized telephone management system according to the present invention.
Figure 2:
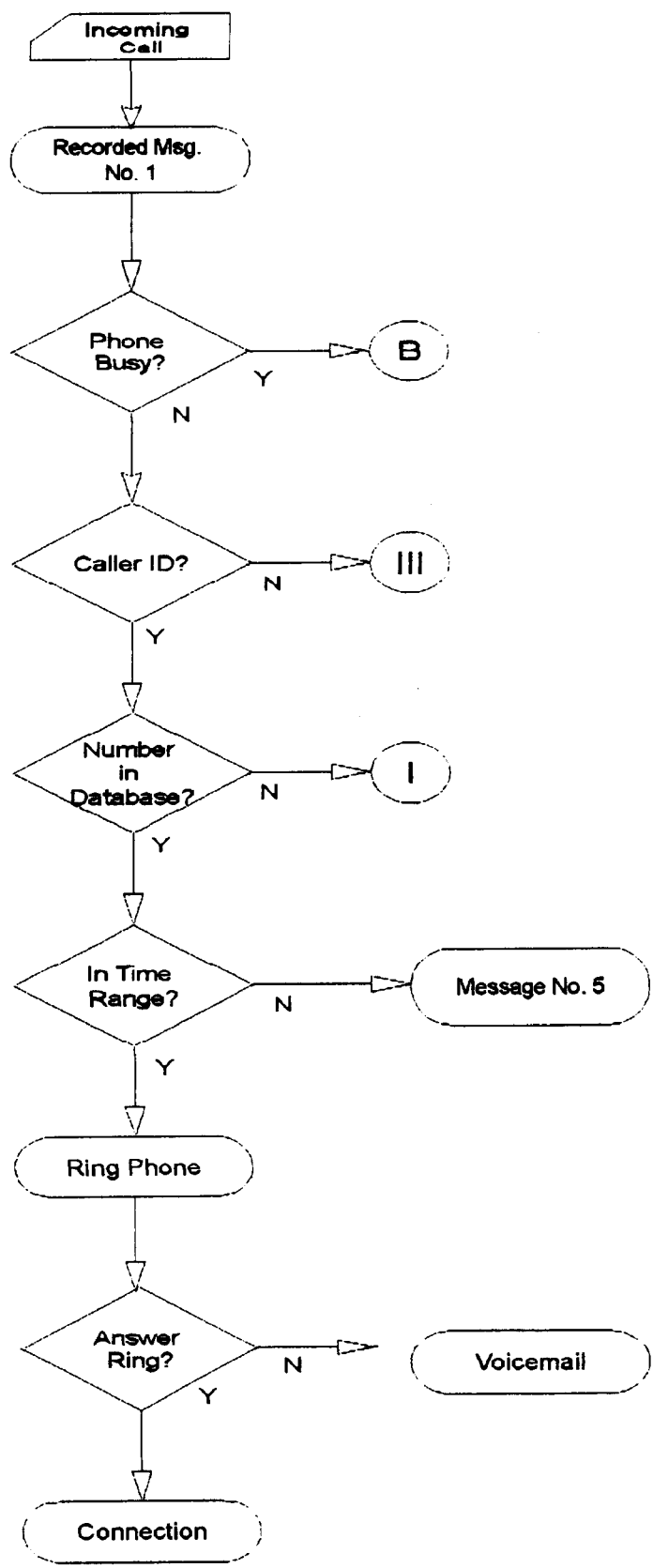
FIG. 2 is a master flow chart describing the routing of an incoming call, employing the automated personalized telephone management system according to the present invention.
Figure 3:
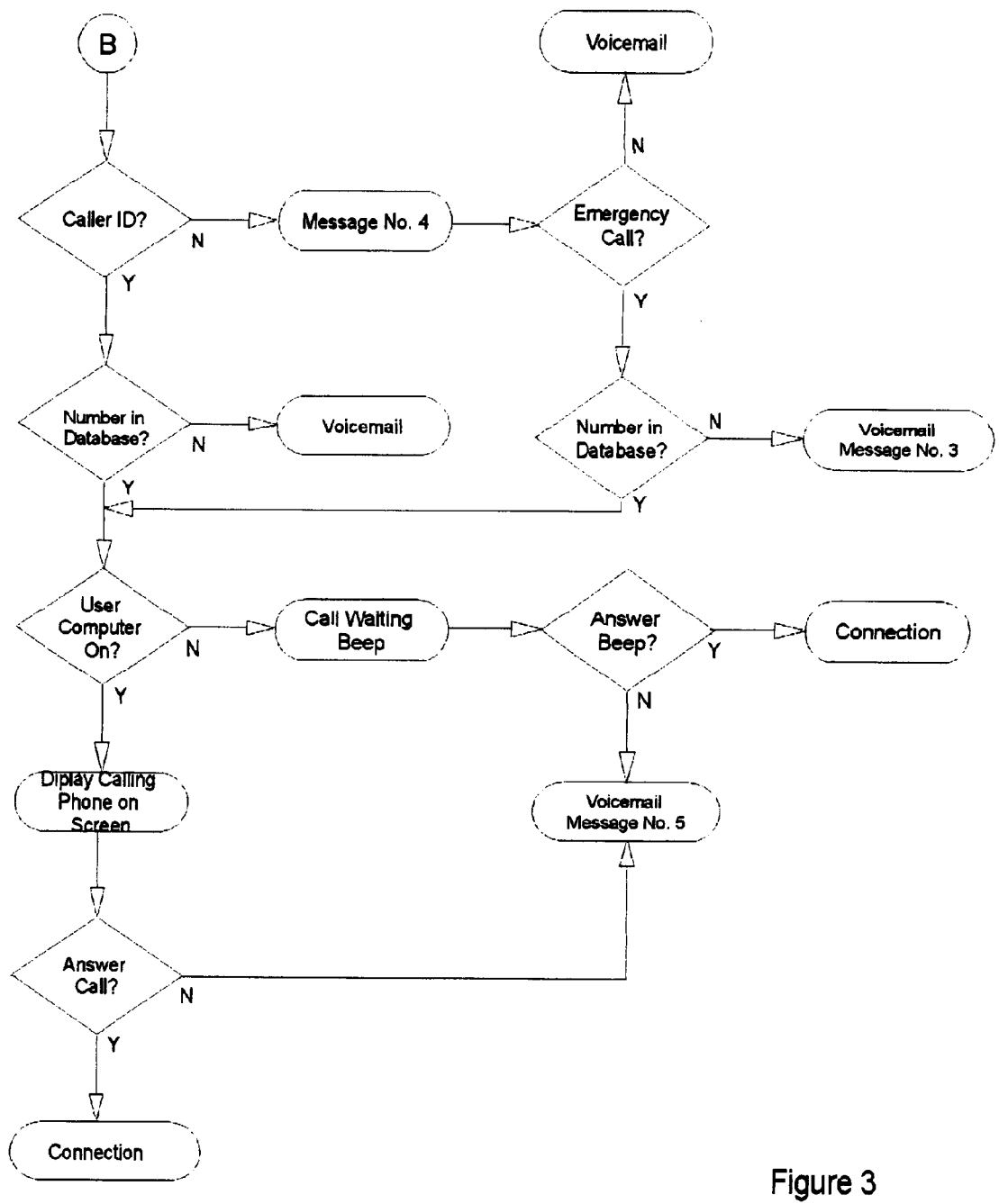
FIG. 3 is a flow chart according to the present invention illustrating the response when the incoming call is confronted with a busy phone line and the called party has call waiting service.
Figure 4:
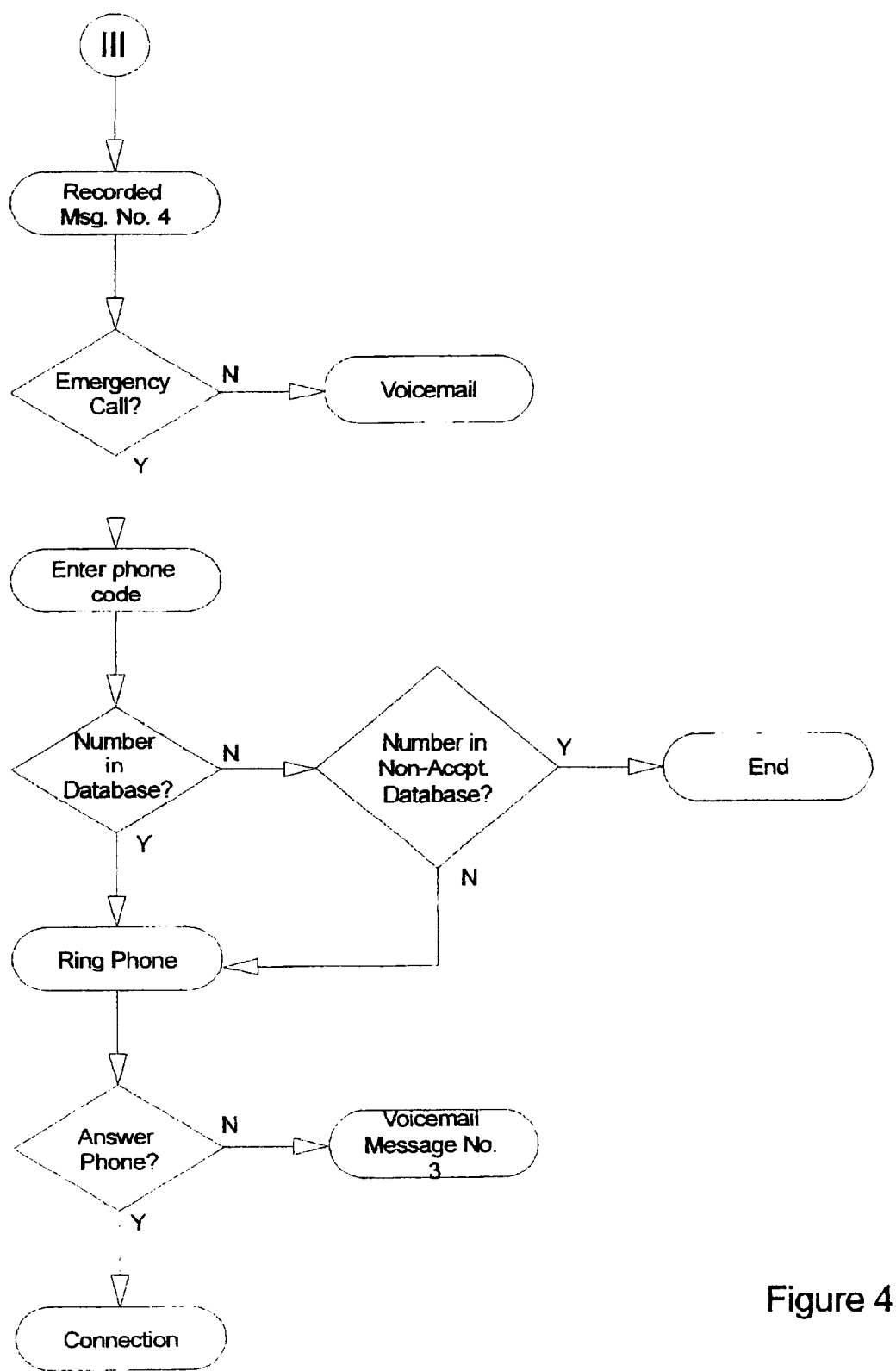
FIG. 4 is a flow chart according to the present invention for callers who either block their identifying number (ANI) or do not have ANI service.
Figure 5:
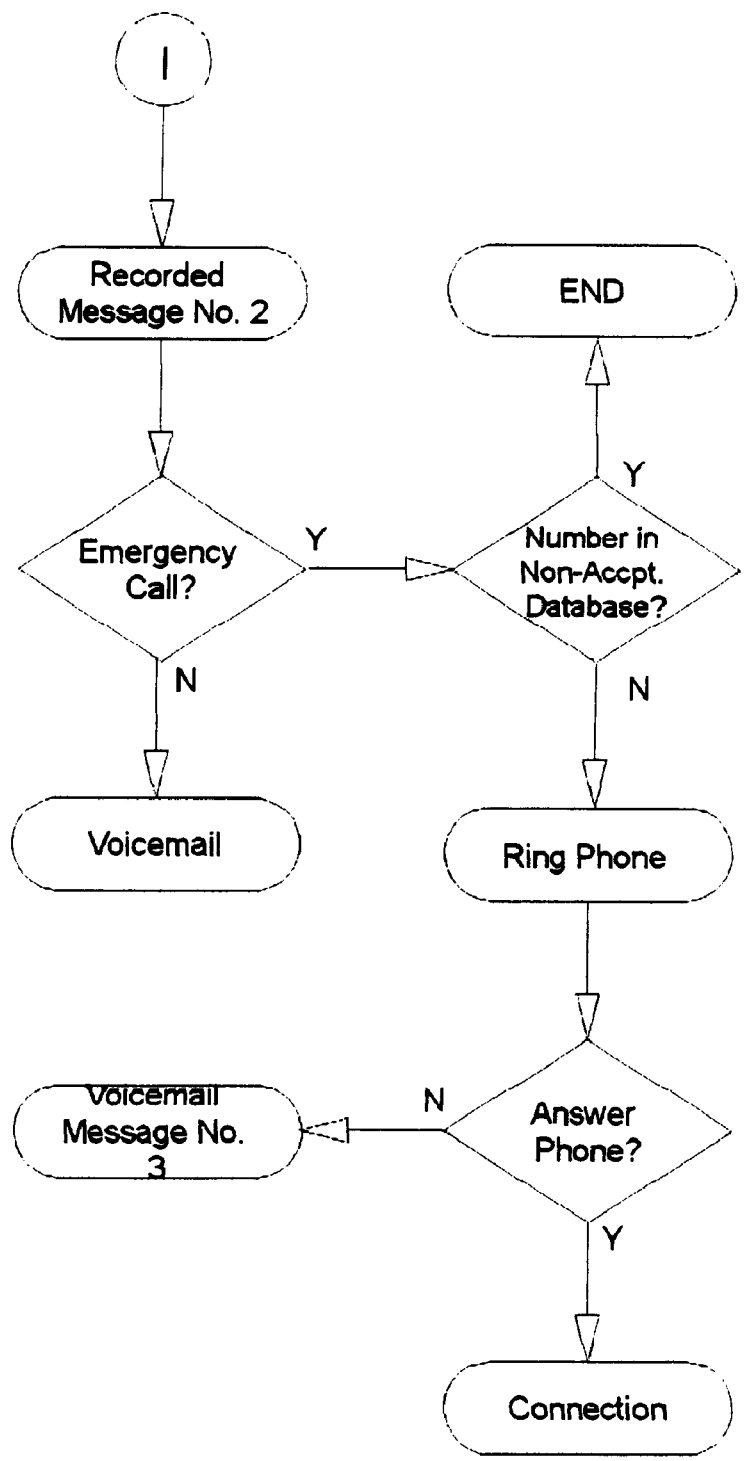
FIG. 5 is a flow chart according to the present invention demonstrating the response for calls with ANI service that does not block the ANI function, but whose numbers are not included in the user's database.
Figure 6:
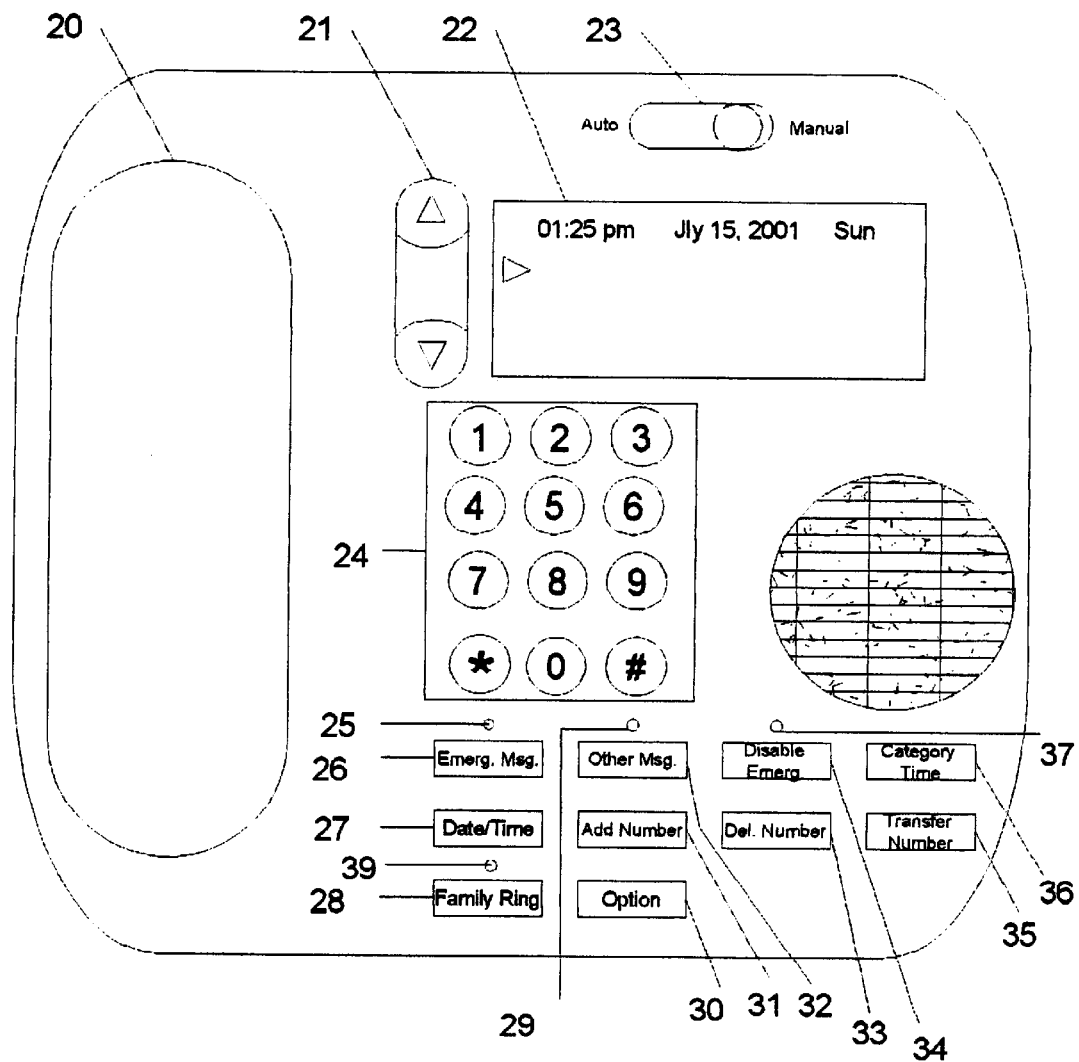
FIG. 6 is a schematic depicting the physical layout of an automated personalized telephone management system according to the present invention.

The invention's operating methodology for automated decision making and performance is shown in FIGS. 1 through 5. FIG. 1 describes the basic hardware design. FIG. 6 shows the invention layout. FIGS. 2 through 5 are software flow charts which are self-explanatory and understood by those of skill in this art. FIG. 2 presents the main routine, which shows the branches to the three main subroutines (B, I, III). FIG. 3 describes subroutine B. FIG. 4 describes subroutine III, and FIG. 5 shows subroutine I.

Referring now to the drawings, FIG. 1 is a block diagram of the automated personalized telephone management system according to the present invention. The telephone system incoming calls are routed through a telephone calling circuit (9). From the telephone calling circuit the signal goes to an ANI detector and decoder (13). The ANI detector and decoder identifies caller IDs, processes, then digitizes the signal so it will be compatible with the central processing unit (CPU) (17). The telephone calling circuit also goes to the hook control circuit (10) to detect on/off hook conditions. This signal also goes to the CPU for use by the software in processing incoming calls. The CPU is the controlling device. The CPU software uses information supplied by many sources to ensure operation. The sources include the system clock (16), the database (19), the information contained in the incoming digitized phone signal (8), the options entered by the user, and in some cases the information entered by the caller. This information ensures proper signal processing, call routing, and output (visual and audible) to the user via the telephone handset, the user interface, and the display unit (15). Outputs of the system may be routed to the center for messages (14), the phone ring generator (11), the display unit (15) and possibly an active computer. The user interface and display unit allow the user to save phone numbers in different categories, delete phone numbers, change time and date, store unacceptable phone numbers, turn emergency calls subsystem on and off, and to save, delete or listen to recorded phone calls. The system also includes a manual/auto switch. In the manual mode the system behaves like a typical telephone/answering machine system. The telephone numbers entered by the user are stored in the phone number database and any required temporary data storage required during processing are stored in provided extra memory (18).

The physical layout of the automated personalized telephone management system is shown in FIG. 6. A brief description of the system's modes of operation associated with each component's manipulation follows. The handset (20) is a typical speaker/microphone used with traditional telephones. The auto/manual switch (23) allows operation as a typical phone/answering machine operation (manual mode). An incoming call will ring the phone a set number of rings, and if there is no answer the call is routed to the answering machine. The auto mode is described below. The display unit (22) can display four-lines of information. The top line displays the date and time. The user interface consists of the keyboard (24) and various buttons. The user keyboard allows the user to input numeric data or selection of different options shown on the display unit. An emergency message button (26) allows the user to read and manipulate emergency messages. A blinking red LED (25) located above the button notifies the user that he had received an emergency message(s). Also whenever the user picks up the phone, or any phone on that line, an identifiable beep associated with messages will be heard. By pushing the button all new and saved messages would be listed. The user would then use the scroll bar (21) to select the message to be played. After listening to the emergency message, the user would then have the option of saving, deleting, or transferring the calling number to the non-acceptable phone numbers software database.

The other messages button (32) allows the user to play non-emergency received messages. A blinking green LED (29) above the button alerts the user he has received other messages. By pushing the button a list of categories (family, friends, other) would be shown on the display unit. Any category with new messages would blink. The user would then select the category he wished to see. Then a list of messages would be displayed. By using the scroll bar the user would then select the messages he wished to hear. After listening he could save or delete the message. The disable emergency button (34) allows the user to turn off the emergency function for the case III condition, should any harassing calls be experienced. A yellow LED (37) above the button is turned on when the emergency function is disabled. The date/time button (27) allows the user to set the time and date. By pushing the button the preset time would be displayed with a blinking cursor under the first digit. The user would press the number on the keyboard he wished to enter. The blinking cursor would move to the next digit and the user would enter the correct number and so on. When the number is correctly entered, the user would then press 1 for AM or 2 for PM as directed by the display unit. The user would then enter the date in a similar fashion.

The "Add Number" button (31) allows the user to store a phone number in one of the three categories (family, friends, or other) by pressing the button the display unit would allow selection of a category. After selecting a category the user would enter a phone number after verification by the user the number is entered in the database. The "Del Number" button (33) allows the user to delete a number from one of the three categories or from the non-acceptable category. The user would press the delete button, and then by using the keyboard and display unit he would select the category, and then the phone number to delete. The "Transfer Number" button (35) is used for two functions. The first function is to transfer phone numbers recorded for emergency calls received to the non-acceptable category. The second is to switch numbers between the three main categories. By pressing the button the user would then be given the option of selecting function one or function two. If he selects function one, the numbers in the emergency call list would be displayed. The user would then select the number he wishes to transfer. Then upon verification the number would be placed in the non-acceptable call category. If the user selects function two, he would first be given the option of selecting the category containing the phone number he wishes to transfer. After selecting the category he would then select the phone number to transfer, and finally the category he wishes to transfer the number to. He would then verify the selection, and the number would be transferred.

The purpose of the "Category Time" button (36) is to set the time span during which the phone will ring for each of the three categories (family, friends, and others). Calls received outside of this time span will be routed to voicemail. By pressing the button, the display unit allows the user to select the category for which he desires to change the time span. After selecting the category, the user enters the start time, and then the end time. After the times are verified as being correct, they are entered into the system. When the "Family Ring" button (28) is activated, the phone numbers in the family category are all set to always ring, regardless of the system time settings for ring and voicemail. Also when the "Family Ring" button is activated, the phone numbers in the friends and others category are all set to always voicemail, regardless of the system time settings for ring and voicemail. When the "Family Ring" button is deactivated, the system time settings for ring and voicemail are restored for all three categories, family, friends, and others. An LED (39) informs the user when the "Family Ring" option has been activated. The final button is the "Option" button (30). This button is reserved for future enhancements.

The system is also capable of handling numerous phone extensions (hardwired or wireless) within the home, as well as cellular phones when a one phone number methodology is employed.

The subject invention has been described in detail with respect to certain preferred embodiments thereof. As is understood by those of skill in this art, variations and modification in this detail may be made without any departure from the spirit and scope of the present invention, as defined in the hereto-appended claims.

I claim:

1. An automated, personalized telephone call management system, which comprises the following elements:
  A. Means for inputting and storing telephone numbers within a plurality of priority groups in a database, and means for inputting and storing time periods for telephone call acceptance within each of the plurality of priority groups in the database;
  B. Means for manually or automatically altering the time periods for telephone call acceptance within each of the plurality of priority groups in the database;
  C. Means for providing a telephone ring for an incoming call emanating from a caller employing a telephone, the number of which matches a telephone number stored in the database within one of the plurality of priority groups, and only when the actual time of the call is within the time period for call acceptance within one of the plurality of priority groups in the database, coupled with means for transferring out of time acceptance period calls and other incoming calls to a smart answering message system providing a recorded message audible only to the caller and requesting that a communication be left by the caller;
  D. Means for providing a telephone ring for an incoming call emanating from an exigency caller employing a telephone, the number of which does not match a telephone number within one of the plurality of priority groups in the database, coupled with means for providing a prompt to the exigency caller through the smart answering message system to press star on the keyboard of his/her telephone, thereby actuating auxiliary methodology to provide a telephone ring;
  E. Means for entering into the database the number of the telephone from which an exigency caller has actuated the auxiliary methodology to provide a telephone ring, whether or not the call has been answered, coupled with means for causing a special indicator light to blink, thereby showing that an exigency call has been received; and
  F. Means for inputting and storing within a non-acceptable caller data bank in the database the telephone number of any exigency caller who inappropriately uses the star key to activate the auxiliary methodology to provide a telephone ring, coupled with means for ensuring that any subsequent call from any number within the non-acceptable caller data bank in the database will not actuate the auxiliary methodology to provide a telephone ring.

2. The automated personalized telephone call management system of claim 1, which additionally comprises call-waiting methodology coupled with means for providing a call-waiting signal only when the telephone number of the telephone from which an incoming call emanates matches a telephone number stored in the database within one of the plurality of priority groups, including exigency generated calls, coupled with means for transferring other incoming calls to the smart answering message system.

3. The automated personalized telephone call management system of claim 1, which additionally comprises means for inputting and storing telephone numbers within an internet operations grouping in the database, coupled with means for providing interacting methodology for a special priority call selection when the internet is being accessed on the same telephone line.

4. The automated personalized telephone call management system of claim 1, which additionally comprises means for integrating home or office telephones and cellular telephones into the personalized telephone call management system.

5. The automated personalized telephone call management system of claim 1, which is provided as a self-contained hardware/software consumer product for home or office use.

6. The automated personalized telephone call management system of claim 1, which is provided as a module maintained by a telecommunications provider in their infrastructure to supply a value-added service.

7. The automated personalized telephone call management system of claim 1, which additionally comprises means for providing a non-blinking light to indicate non-exigency messages recorded by the smart answering message system.

8. The automated personalized telephone call management system of claim 1, which additionally comprises means for providing remote interrogation for messages recorded by the smart answering message system.

9. The automated personalized telephone call management system of claim 1, which additionally comprises means for maintaining current date and actual time inputs.

10. The automated personalized telephone call management system of claim 1, which additionally comprises means for deactivating and reactivating the exigency function of the system.

11. The personalized telephone call management system of claim 1, which additionally comprises means for achieving a software function to allow remote deactivation of the entire system for leased systems.

* * * * *